(12) United States Patent
Heidinga et al.

(10) Patent No.: US 10,606,629 B2
(45) Date of Patent: *Mar. 31, 2020

(54) ENHANCING VIRTUAL MACHINE PERFORMANCE USING AUTONOMICS

(71) Applicant: International Business Machines Corporation, Armonk, NY (US)

(72) Inventors: Daniel Heidinga, Ottawa (CA); Peter D. Shipton, Ontario (CA); Aleksandar Micic, Ontario (CA); Devarghya Bhattacharya, New Brunswick (CA); Kenneth B. Kent, New Brunswick (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,086

(22) Filed: Dec. 15, 2017

(65) Prior Publication Data

US 2019/0056967 A1 Feb. 21, 2019

Related U.S. Application Data

(63) Continuation of application No. 15/677,662, filed on Aug. 15, 2017.

(51) Int. Cl.
| | |
|---|---|
| *G06F 9/455* | (2018.01) |
| *G06F 9/46* | (2006.01) |
| *G06F 13/16* | (2006.01) |
| *G06F 12/02* | (2006.01) |
| *G06F 11/34* | (2006.01) |
| *G06F 9/445* | (2018.01) |

(52) U.S. Cl.
CPC ...... *G06F 9/45558* (2013.01); *G06F 9/45504* (2013.01); *G06F 9/45508* (2013.01); *G06F 11/34* (2013.01); *G06F 12/0253* (2013.01); *G06F 13/1673* (2013.01); *G06F 9/44505* (2013.01); *G06F 2009/45583* (2013.01); *G06F 2212/702* (2013.01)

(58) Field of Classification Search
CPC .................................................. G06F 9/45558
See application file for complete search history.

(56) References Cited

U.S. PATENT DOCUMENTS

| | | |
|---|---|---|
| 6,823,509 B2 | 11/2004 | Webb |
| 7,426,720 B1 | 9/2008 | Fresko |

(Continued)

OTHER PUBLICATIONS

Neu et al., Automatic Application Performance Improvements through VM Parameter Modification after Runtime Behavior Analysis Dec. 9, 2014. (Year: 2014).*

(Continued)

*Primary Examiner* — Bradley A Teets
(74) *Attorney, Agent, or Firm* — Scully, Scott, Murhpy & Presser, P.C.; Nicholas Bowman, Esq.

(57) ABSTRACT

A first execution of an application is performed on a virtual machine. A set of virtual machine parameters associated with the first execution is determined. One or more command lines of the application are mapped to the set of virtual machine parameters. The mapping is stored in a cache. A second execution of the application is performed on the virtual machine. The second execution retrieves the set of virtual machine parameters from the cache.

6 Claims, 6 Drawing Sheets

(56) References Cited

U.S. PATENT DOCUMENTS

| | | |
|---|---|---|
| 7,870,153 B2 | 1/2011 | Croft et al. |
| 8,281,291 B2 | 10/2012 | Dmitrovich et al. |
| 8,286,152 B2 | 10/2012 | Grcevski et al. |
| 8,910,163 B1 | 12/2014 | Grechishkin et al. |
| 2009/0013171 A1* | 1/2009 | Gilling ................ G06F 9/45533 713/100 |
| 2014/0115585 A1 | 4/2014 | Hrischuk et al. |
| 2017/0004090 A1 | 1/2017 | Karippara et al. |

OTHER PUBLICATIONS

Carvalho N., et al. "Experimental Evaluation of Distributed Middleware with a Virtualized Java Environment", Dec. 12, 2011, 7 pages.

Bonetta, D., "A Multicore-aware Runtime Architecture for Scalable Service Composition", 2010 IEEE Asia-Pacific Services Computing Conference, 2010, pp. 83-90.

Bhattacharya, "Enhancing the Usage of the Shared Class Cache", The University of New Brunswich, Bachelors of Information Technology, WBUT, 2012, Thesis, Oct. 2012, 94 pages.

Anonymos, "Improving the Performance of JVM Startup using the Shared using the Shared Class Cache", PDP 2017: The 25th Euromicro International Conference on Parallel, Distributed and Network-Based Processing; Mar. 6, 2017-Mar. 8, 2-17, St. Petersburg, Russia.

List of IBM Patents or Patent Applications Treated As Related.

* cited by examiner

ENHANCING VIRTUAL MACHINE PERFORMANCE USING AUTONOMICS

STATEMENT REGARDING PRIOR DISCLOSURES BY A JOINT INVENTOR

The following disclosure is submitted under 35 U.S.C. 102(b)(1)(A):

DISCLOSURE: "Enhancing the Usage of the Shared Class Cache" by Devarghya Bhattacharya; Bachelors of Information Technology, WBUT, 2012 (a THESIS SUBMITTED IN PARTIAL FULFILLMENT OF THE REQUIREMENTS FOR THE DEGREE OF Master of Computer Science); The University of New Brunswick October, 2016)

FIELD

The present invention relates to virtual machines.

BACKGROUND

Programs written in Java programming language (Java is a trademark of Sun Microsystems Inc.) are generally run in a virtual machine environment, rather than directly on hardware. A virtual machine is a software-based computer that, like a physical computer, runs an operating system and applications. The virtual machine is comprised of a set of specification and configuration files and is backed by the physical resources of a host or platform. A Java program is typically compiled into byte-code form, and then interpreted by a Java Virtual Machine (JVM) into hardware commands for the platform on which the JVM is executing. The JVM itself is an application running on an underlying operating system of the platform. One advantage of this approach is that Java applications can run on any of a very wide variety of platforms.

Java is an object-oriented language. A Java program is formed from a set of class files having methods that represent sequences of instructions. These sequences of instructions are somewhat akin to subroutines. A hierarchy of classes can be defined, with each class inheriting properties (including methods) from those classes which are above it in the hierarchy. For any given class in the hierarchy, its descendants below it are called subclasses, while its ancestors above it are called superclasses. At run-time of an application, objects are created as instantiations of these class files, and the class files themselves are effectively loaded as objects. One Java object can call a method in another Java object.

JVMs utilize many internal buffers that grow dynamically during application execution. Growing these internal buffers can lead to repeated library function calls which adversely affect performance and cause a fragmentation of memory. For example, malloc is a library function that is used to allocate a block of memory on an internal buffer called a heap. The application accesses this block of memory via a pointer that is returned by the malloc call. The heap is an area of pre-reserved computer main storage (memory) that a program process can use to store data in some variable amount that will not be known until the program is running. The internal buffers utilized by the JVM start out small and are expanded on demand. A first execution of the application expands the internal buffers to a first maximum value. Then, if the application is executed again, the internal buffers will grow from their initial values to a second maximum value that equals the first maximum value. The internal buffer expansion occurs every time that the application is executed, resulting in inefficiencies.

SUMMARY

The following summary is merely intended to be exemplary. The summary is not intended to limit the scope of the claims.

A computer-implemented method, in one aspect, may comprise performing a first execution of an application on a virtual machine, determining a set of virtual machine parameters associated with the first execution by mapping one or more command lines of the application to the set of virtual machine parameters, or by using a set of default values for the set of virtual machine parameters, storing the set of virtual machine parameters in a cache, and performing a second execution of the application on the virtual machine wherein the second execution retrieves the set of virtual machine parameters from the cache.

A computer program product, in another aspect, may comprise a computer-readable storage medium having a computer-readable program stored therein, wherein the computer-readable program, when executed on a computing device including at least one processor, causes the at least one processor to perform a first execution of an application on a virtual machine, determine a set of virtual machine parameters associated with the first execution by mapping one or more command lines of the application to the set of virtual machine parameters, or by using a set of default values for the set of virtual machine parameters, store the set of virtual machine parameters in a cache, and perform a second execution of the application on the virtual machine wherein the second execution retrieves the set of virtual machine parameters from the cache.

An apparatus, in another aspect, may comprise a computing device including at least one processor and a memory coupled to the at least one processor, wherein the memory comprises instructions which, when executed by the at least one processor, cause the at least one processor to perform a first execution of an application on a virtual machine, determine a set of virtual machine parameters associated with the first execution by mapping one or more command lines of the application to the set of virtual machine parameters, or by using a set of default values for the set of virtual machine parameters, store the set of virtual machine parameters in a cache, and perform a second execution of the application on the virtual machine wherein the second execution retrieves the set of virtual machine parameters from the cache.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
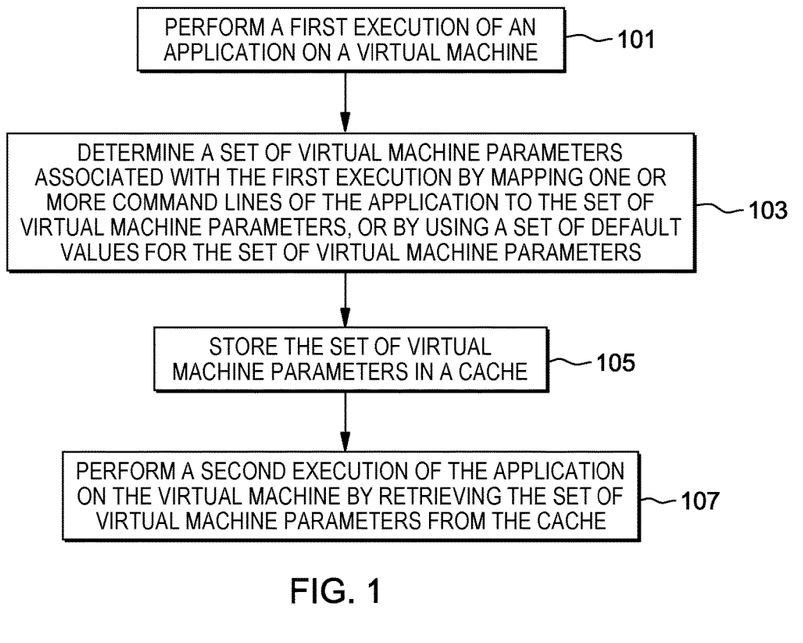
FIG. 1 illustrates a first exemplary computer-executed method for enhancing virtual machine performance in accordance with one or more embodiments of the invention.

FIG. 1 illustrates an exemplary computer-executed method for enhancing virtual machine performance in accordance with one or more embodiments of the invention. The procedure commences at block 101 where a first execution of an application is performed on a virtual machine. Next, at block 103, a set of virtual machine parameters associated with the first execution are determined.

For purposes of illustration, block 103 may be performed by mapping one or more command lines of the application to the set of virtual machine parameters. Alternatively or additionally, block 103 may be performed by using a set of default values for the set of virtual machine parameters. For purposes of illustration, the set of virtual machine parameters may include a set of buffer sizes associated with the first execution, or a set of maximum buffer sizes associated with the first execution. For purposes of illustration, the mapping may be performed by mapping a single command line of the application to an entire set of buffer sizes, or to a subset of the entire set. Alternatively or additionally, the mapping may be performed by mapping each of a plurality of respective command lines of the application to a corresponding buffer size of the set of virtual machine parameters, or by mapping each of a plurality of respective command lines to the entire set of virtual machine parameters.

The operational sequence advances to block 105 where the set of virtual machine parameters are stored in a cache. A second execution of the application on the virtual machine is performed at block 107. The second execution retrieves the set of virtual machine parameters from the cache.

According to a set of further embodiments, the virtual machine parameters comprise a set of buffer sizes. One or more buffer sizes in the set of buffer sizes may comprise a maximum buffer size. Pursuant to this illustrative example, the method of FIG. 1 is based on a realization that the first execution of the application expands the internal buffers to a first set of maximum buffer sizes. Then, when the application is executed again using a conventional approach, the internal buffers will grow from their initial values to a second set of maximum buffer sizes that equals the first set of maximum buffer sizes. The conventional approach of expanding the internal buffers every time that the application is executed is very inefficient. By contrast, the present example provides greater economy and enhanced levels of efficiency because an application can start with the same set of maximum buffer sizes as were employed during a previous execution of the application. JVM metadata including the set of maximum buffer sizes is associated with or mapped to one or more command lines of the application in such a way that subsequent runs of the application benefit from the saved metadata to improve footprint and startup performance for the application. The set of maximum buffer sizes may specify a maximum size for any of a virtual machine stackmap buffer, a maximum garbage collector (GC) heap size, a thread pool size, a string intern table size, or a maximum heap size.

According to another set of further embodiments, the set of virtual machine parameters comprises one or more specialized sections of heap memory. These one or more specialized sections may include, for example, a Nursery Size for Generational Collectors. As a more generalized consideration, the set of virtual machine parameters can focus on parameters that (1) require a relatively long execution to establish an optimum value; and (2) cannot easily change their value once initially set (for example, the Nursery Size for Generational Collectors). Those parameters for which an optimum value is not readily established at the commencement of execution can be determined via a learning process at startup or a learning process based upon any recent virtual machine behavior. An example of such a parameter is a Large Object Area (LOA).

Figure 2:
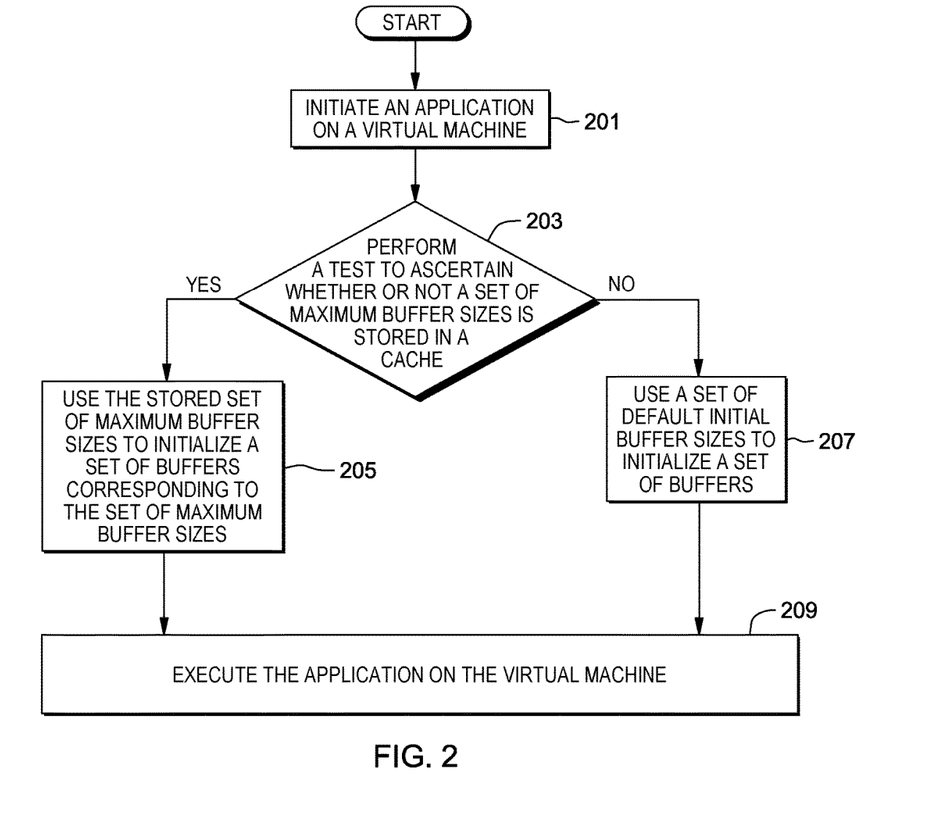
FIG. 2 illustrates a second exemplary computer-executed method for enhancing virtual machine performance in accordance with one or more embodiments of the invention.

FIG. 2 illustrates a second exemplary computer-executed method for enhancing virtual machine performance in accordance with one or more embodiments of the invention. At block 201, an application is initiated on a virtual machine such as a JVM. Then, at block 203, a test is performed to ascertain whether or not a set of maximum buffer sizes is stored in a cache. If so, the method progresses to block 205 where the stored set of maximum buffer sizes is used to initialize a set of buffers corresponding to the set of maximum buffer sizes. The application is then executed on the virtual machine (block 209).

The negative branch from block 203 leads to block 207 where a set of default initial buffer sizes are used to initialize a set of buffers. Then the application is executed on the virtual machine (block 209).

Figure 3:
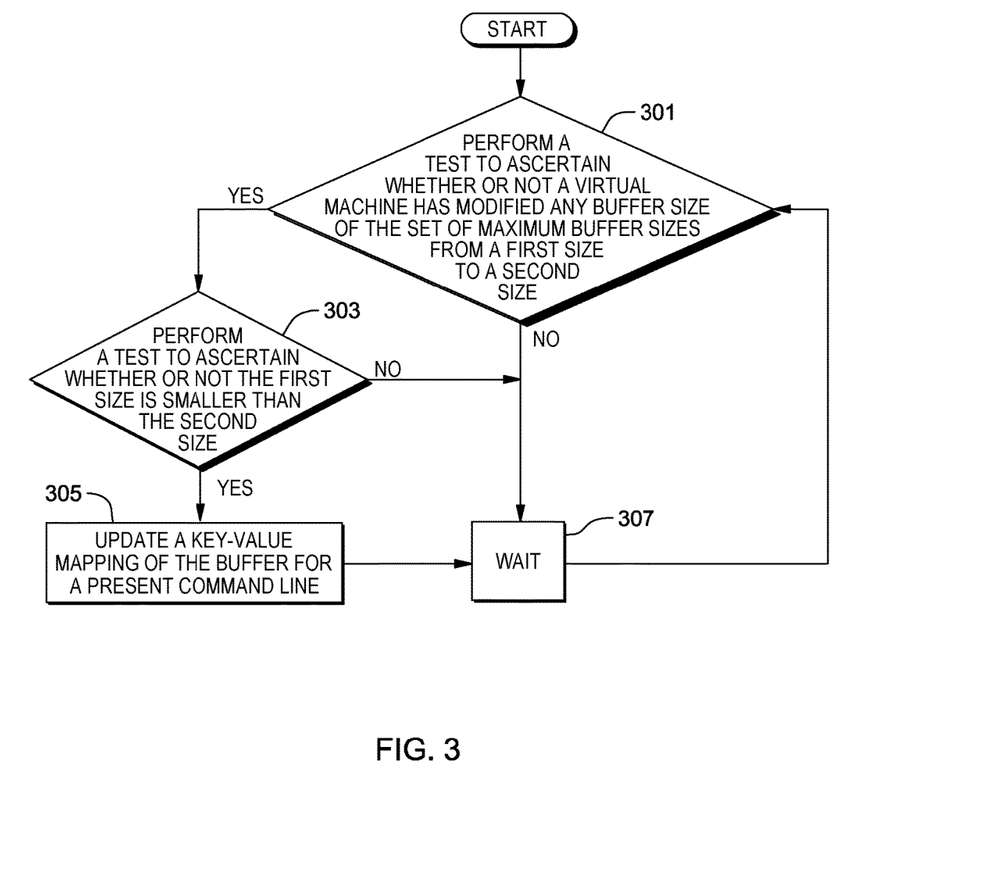
FIG. 3 illustrates a third exemplary computer-executed method for enhancing virtual machine performance in accordance with one or more embodiments of the invention.

FIG. 3 illustrates a third exemplary computer-executed method for enhancing virtual machine performance in accordance with one or more embodiments of the invention. With regard to block 105 of FIG. 1, the virtual machine can update a mapping of one or more command lines of the application to one or more buffer sizes of the set of maximum buffer sizes. This updating may be performed at any of three different points: (a) when any buffer size in the set of maximum buffer sizes changes; (b) when the virtual machine performs a phase change from a start-up to a steady state (there are existing JVM hooks for these phase changes); (c) when the virtual machine shuts down.

The procedure of FIG. 3 considers situations where one or more buffer sizes in the set of maximum buffer sizes changes. In response to the one or more size changes, the stored mapping of one or more command lines of the application to the one or more buffer sizes of the set of maximum buffer sizes is updated. At block 301, a test is performed to ascertain whether or not a virtual machine has modified a buffer size from a first size to a second size. The affirmative branch from block 301 leads to block 303 where a test is performed to ascertain whether or not the first size is smaller than the second size. The affirmative branch from block 303 leads to block 305 where a key value mapping of the buffer is updated for a present command line. The program then advances to block 307 where the program waits for a predetermined or specified amount of time before looping back to block 301. The negative branch from block 301 leads to block 307. Likewise, the negative branch from block 303 leads to block 307.

Figure 4:
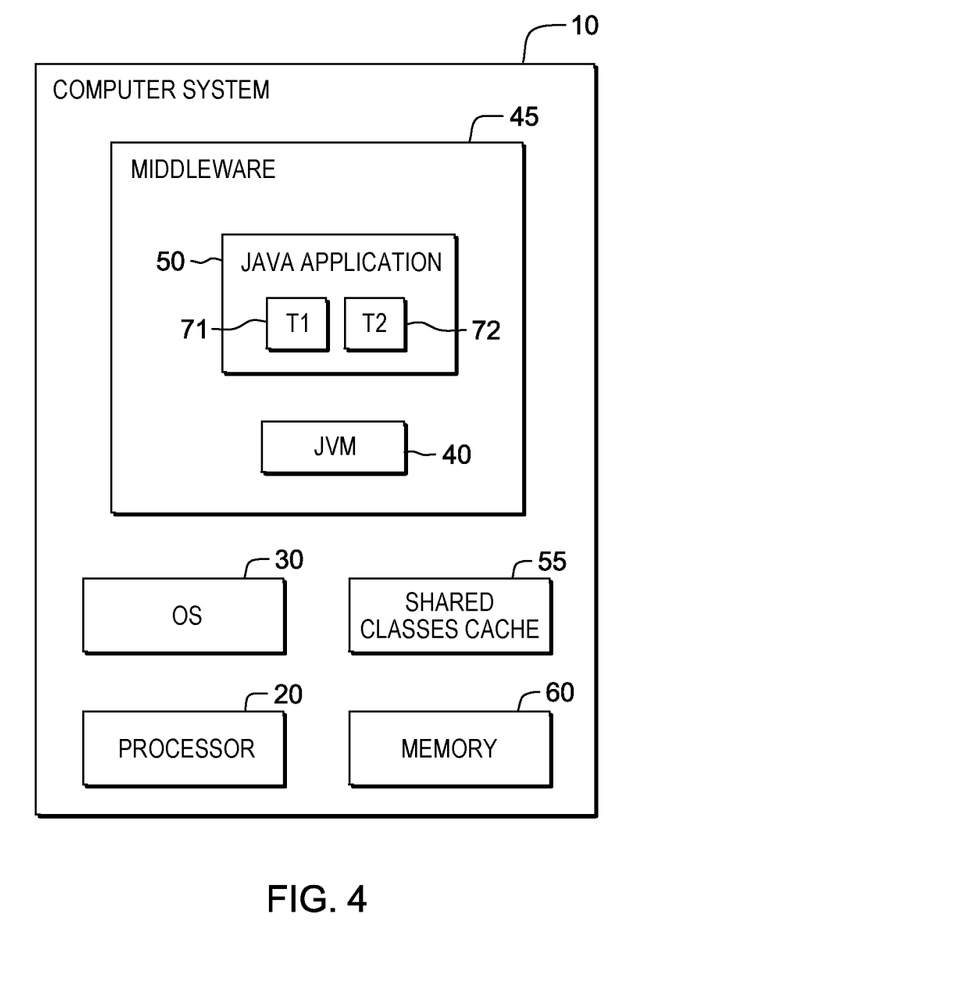
FIG. 4 shows a schematic diagram of a computer system supporting a Java Virtual Machine (JVM).

FIG. 4 shows a schematic diagram of a computer system 10 supporting a Java Virtual Machine (JVM). The computer system 10 includes a processor 20 which is used to run software loaded into a memory 60. For purposes of illustration, the processor 20 may be implemented using one or more microprocessors. The software can be loaded into the memory 60 by any of various means (not shown), for example from a removable storage device such as a floppy disc or CD ROM, or over a network such as a local area network (LAN) or telephone/modem connection, typically via a hard disk drive (also not shown). The computer system 10 runs an operating system (OS) 30, on top of which is provided a Java virtual machine (JVM) 40. The JVM behaves like an application from the standpoint of the (native) OS 30, but in fact functions itself as a virtual operating system, supporting a Java application 50. The Java application 50 may include multiple threads, illustrated by threads T1 71 and T2 72.

At block 105 (FIG. 1), recall that the set of maximum buffer sizes was associated with one or more command lines of the application (such as the Java application 50, FIG. 4) using a cache. Illustratively, this cache is implemented using a Shared Classes cache 55. The Shared Classes cache 55 stores buffer sizes and metadata from one or more previous Java application 50 runs in a way that allows subsequent runs of the application to locate these buffer sizes and metadata. A command line is used to differentiate between each of a plurality of different applications.

The concept of a Shared Classes cache 55 has been introduced in version 5 of Java. The Shared Classes cache 55 is a common memory space that is shared among multiple JVM 40 instances. This common memory space constitutes a persistent dynamic class cache on which all system and application classes can be stored. The Shared Classes cache 55 provides a very powerful tool for reducing virtual memory footprint and improving JVM 40 startup time. For this reason, it is well suited to environments where more than one JVM 40 is running similar code, or where the JVM 40 is regularly restarted.

The Shared Classes cache 55 enables class sharing by adding a parameter Xshareclasses[:name=<cachename>] to an existing Java command line. When the JVM 40 starts up, it looks for a class cache of the name given (if no name is provided, it chooses a default name), and it either connects to an existing cache or creates a new one, as required. Cache size is specified using a parameter—Xscmx<size>[k|m|g]; this parameter only applies if a new cache is created by the JVM 40. If this option is omitted, a platform-dependent default value is chosen (typically 16 MB). Note that there are operating system 30 settings that can limit the amount of shared memory that can be allocated—for instance, a maximum total shared memory (SHMMAX) on Linux™ is typically set to about 20 MB.

The Shared Classes cache 55 is an area of shared memory of fixed size that persists beyond the lifetime of any JVM 40 using it. Any number of shared class caches can exist on a system, subject to operating system 30 settings and restrictions; however, a single JVM 40 can only connect to one cache during its lifetime. No JVM 40 owns the cache, and there is no master/slave JVM 40 concept; instead, any number of JVMs can read and write to the cache concurrently. A cache is deleted either when it is explicitly destroyed using a JVM 40 utility, or when the operating system 30 restarts. A cache cannot persist beyond an operating system 30 restart. A cache cannot grow in size and, when it becomes full, the JVM 40 can still load classes from it, but cannot add any classes to it.

When the JVM 40 loads a class, it first looks in the Shared Classes cache 55 to see if the class it needs is already present. If this class is already present, the JVM 40 loads this class from the cache. Otherwise, the JVM 40 loads the class from a file system and writes the loaded class into the cache as part of a defineClass( ) call. A non-shared JVM 40 has the following Class loader lookup order: first, Class loader cache 180 (FIG. 5); second, parent; and third, file system. By contrast, a JVM 40 (FIG. 4) running with class sharing uses the following lookup order: first, Class loader cache 180 (FIG. 5); second, parent; third, Shared Classes cache 55 (FIG. 4); and fourth, file system. Classes are read from and written to the Class loader cache 180 (FIG. 5) and the Shared Classes cache 55 (FIG. 4) using a public Helper API.

Java classes are divided into two parts: a read-only part called a ROMClass, which contains all the class's immutable data, and a RAMClass that contains data that is not immutable, such as static class variables. A RAMClass points to data in its ROMClass, but the two are completely separate, which means that it is quite safe for a ROMClass to be shared between JVMs and even between RAMClasses in the same JVM.

In the non-shared case, when the JVM loads a class, it creates the ROMClass and the RAMClass separately and stores them both in its local process memory. In the shared case, if the JVM 40 finds a ROMClass in the class cache, it only needs to create the RAMClass in its local memory; the RAMClass then references the shared ROMClass.

Because the majority of class data is stored in the ROMClass, this is where the virtual memory savings are achieved. JVM 40 startup times are also significantly improved with a populated cache because some of the work to define each cached class has already been performed, and the classes are being loaded from memory, rather than from the file system. Startup time overhead to populate a new cache is not significant, as each class simply needs to be relocated into the cache as it is defined.

The computer system 10 also supports a middleware 45 (FIG. 4) layer, for example a transaction processing environment such as Websphere™, available from IBM Corporation™. The middleware 45 runs as an application or environment on the operating system 30, and initiates the JVM 40. The middleware 45 then performs transactions as Java applications (such as the Java application 50) on top of the JVM 40. In accordance with the present invention, the middleware 45 can cause successive transactions or applications to run on the same JVM 40. In a typical server environment, multiple JVMs may be running on the computer system 10, in one or more middleware environments.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including the processor 20 and control software stored in the memory 60.

Figure 5:
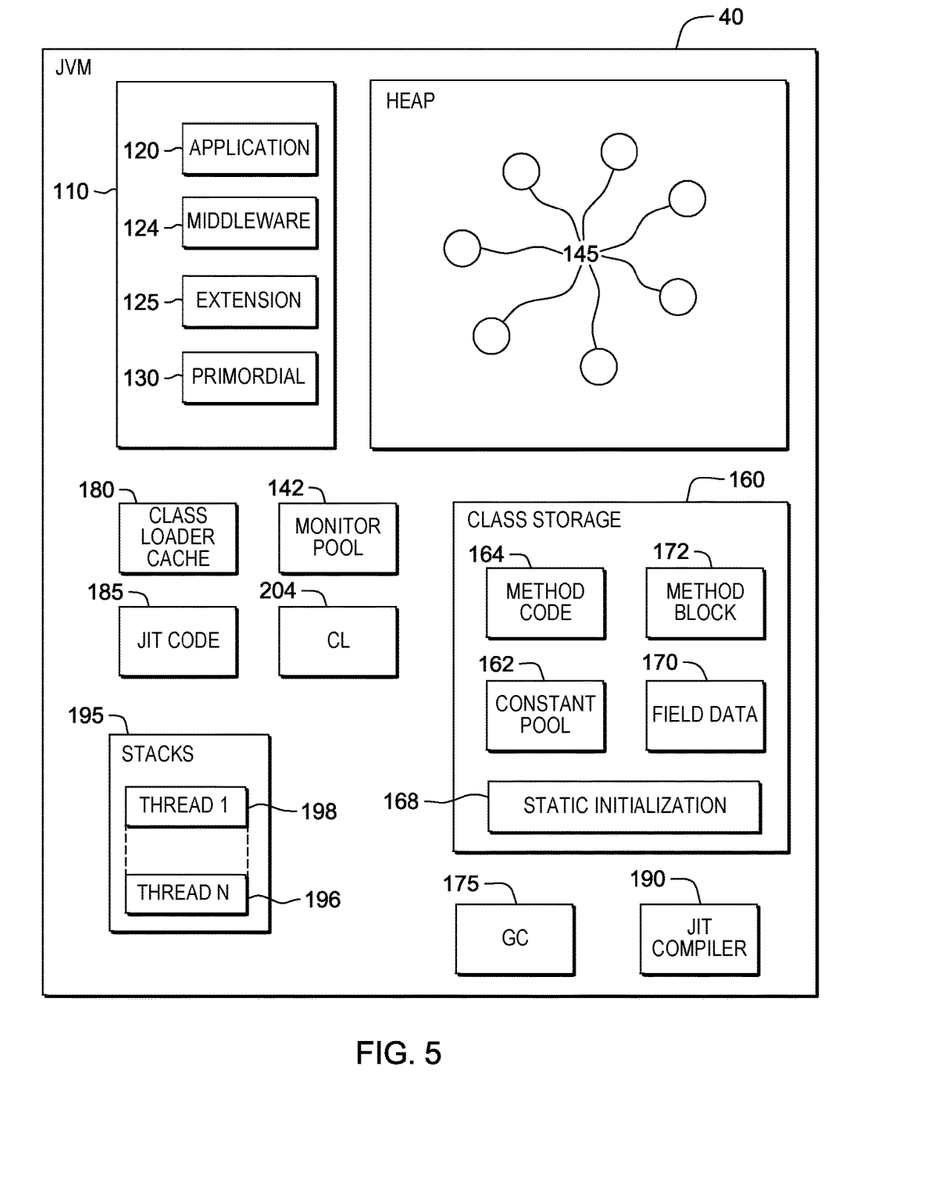
FIG. 5 illustrates some internal components of the JVM of FIG. 4.

FIG. 5 shows the structure of the JVM 40 (FIG. 4) in more detail (omitting some components which are not directly pertinent to an understanding of the present invention). The fundamental unit of a Java program is a class. Thus, in order to run any application, the JVM 40 (FIG. 5) must first load one or more classes forming and required by that application. For this purpose, the JVM 40 includes a hierarchy of class loaders 110, which conventionally includes three particular class loaders named Application 120, Extension 125, and Primordial 130. An application can add additional class loaders 110 to the JVM 40. A class loader of the class loaders 110 is itself effectively a Java program. In one set of preferred embodiments of the present invention, a fourth class loader is also supported, Middleware 124. Classes which are loaded by this Middleware 124 class loader will be referred to hereinafter as middleware, whilst those loaded by the Application Class loader 120 will be referred to as applications.

For each class included within or referenced by a program, the JVM 40 effectively walks up the class loader hierarchy for the class loaders 110, going first to the Application 120 class loader, then the Middleware 124 loader, then the Extension 125 class loader, and finally to the Primordial 130 class loader, to see if any class loader has previously loaded the class. If the response from all of the class loaders 110 is negative, then the JVM 40 walks back down the hierarchy, with the Primordial 130 class loader first attempting to locate the class, by searching in the locations specified in its class path definition. If this search is unsuccessful, the Extension 125 class loader then makes a similar attempt, if this similar attempt fails, then the Middleware 124 class loader tries. Finally, if the Middleware 124 class loader fails, the Application 120 class loader tries to load the class from one of the locations specified in its class path. If the Application 120 class loader fails, or if there is some other problem such as a security violation, the system returns an error. It will be appreciated that a different class path can be defined for each class loader of the class loaders 110.

Note that if it is desired to load a further middleware class loader (i.e. one provided by the user rather than included within the JVM 40 itself), then this can be achieved by declaring that the new class loader implements the Middleware 124 interface. This declaration by itself is sufficient for the JVM 40 to treat it as a Middleware 124 class loader—no other method definitions or such are required.

The JVM 40 further includes a component CL 204, which also represents a class loader unit, but at a lower level. In other words, this is the component that actually interacts with the operating system to perform the class loading on behalf of the different (Java) class loaders 110.

The JVM 40 also includes a heap 140, which is shared between all threads, and is used for storage of one or more objects 145. Each loaded class represents an object of the one or more objects 145, and therefore can be found on the heap 140. In Java, a class file effectively defines a type of object for the one or more objects 145, and this file is then instantiated one or more times in order to utilize the object. Each such instance is itself an object which can be found in heap 140. Thus the objects 145 shown in the heap 140 may represent class objects or other object instances. Note that strictly the class loaders as objects are also stored on heap 140, although for the sake of clarity, they are shown separately in FIG. 5.

The JVM 40 also includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialization methods and other specialized methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data, such as method byte code, etc., in the class storage area 160. They also contain a reference to the class loader which loaded them into the heap, plus other fields such as a flag (not shown) to indicate whether or not they have been initialized.

The JVM 40 further includes a storage area for just-in time (JIT) code 185, equivalent to method byte code which has already been compiled into machine code to be run directly on the native platform. This code is created by the JVM 40 from Java byte code by a compilation process using JIT compiler 190, typically when the application program is started up or when some other usage criterion is met, and is used to improve run-time performance by avoiding the need for this code to be interpreted later.

Another component of the JVM 40 is the stack area 195, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

Also included within JVM 40 are a class loader cache 180 and a garbage collection (GC) unit 175. The former is effectively a table used to allow a class loader to trace those classes which it initially loaded into the JVM. The class loader cache 180 therefore allows each class loader to check whether it has loaded a particular class—part of the operation of walking the class loader hierarchy described previously. Note also that it is part of an overall security policy of the JVM 40 that classes will typically have different levels of permission within the system based on the identity of the class loader by which they were originally loaded.

The garbage collection unit 175 is used to delete objects from the heap 140 when they are no longer required. Thus in the Java programming language, applications do not need to specifically request or release memory, rather this is controlled by the JVM 40 itself. Therefore, when the Java application 120 creates an object of the objects 145, the JVM 40 secures the requisite memory resource. Then, when the Java application finishes using the created object of the objects 145, the JVM 40 can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM 40 implementation to another, but typically GC is scheduled when the heap 140 is nearly exhausted and so there is a need to free up space for new objects.

In general, a class object will not be garbage collected by the JVM 40 unless its class loader is deleted, and unless the class is no longer executing (i.e. no longer referenced from the stack 195 or from another location such as the class cache or another object). Note that the destruction of a class loader (or more accurately, the deletion of all references to the class loader) is in fact a relatively straightforward operation, since it is simply an instance of a class, and can always be reinstantiated. Such deletion is accompanied by the removal of all relevant entries in the class loader cache. The destruction of a class loader has been used in the prior art to allow any class files loaded by that class loader to be reloaded and reinitialized. Finally, FIG. 5 shows a monitor pool 142, which is used for storing a set of locks (monitors) that are used to control contention to an object by different threads at times when exclusive access to the object is required.

Figure 6:
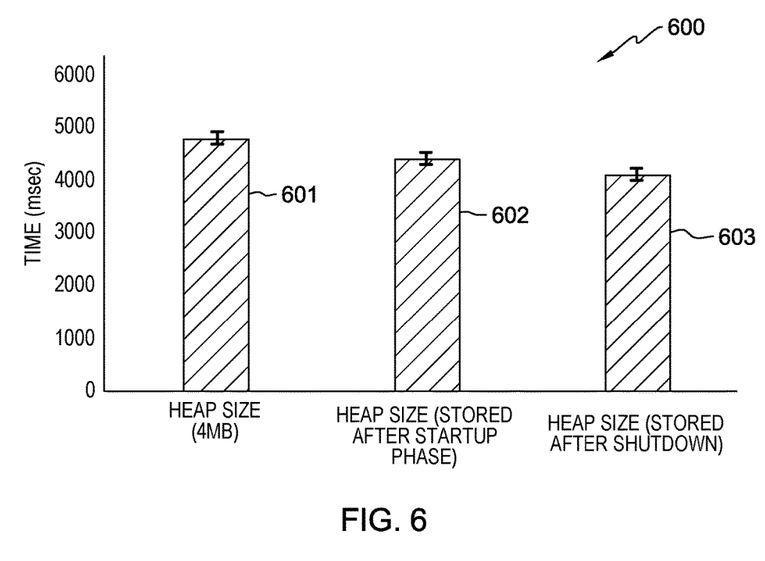
FIG. 6 is a bar graph showing heap sizes as a function of time for an illustrative implementation of the procedure of FIG. 1.

FIG. 6 is a bar graph 600 showing heap sizes as a function of time for an illustrative implementation of the procedure of FIG. 1. A first bar 601 illustrates an initial heap size of 4 MB. The initial heap size is provided for a startup phase of 4900 milliseconds in duration. A second bar 602 illustrates a heap size stored after the startup phase. This heap size lasts for 4300 milliseconds. Then, a third bar 603 illustrates a heap size that is stored after shutdown.

Figure 7:
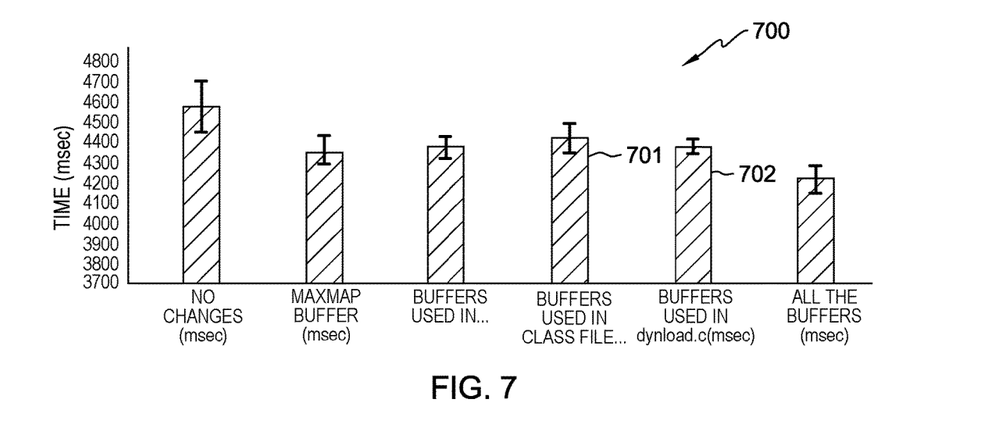
FIG. 7 is a bar graph showing heap buffer utilization as a function of time for an illustrative implementation of the procedure of FIG. 1.

FIG. 7 is a bar graph 700 showing heap buffer utilization as a function of time for an illustrative implementation of the procedure of FIG. 1. This bar graph 700 illustrates performance after storing a set of maximum buffer sizes in the Shared Classes cache 55 (FIG. 4). The bar graph shows buffer sizes used in class filters 701 and buffer sizes used for dynamic loading 702.

Any of the methods described in connection with FIGS. 1-3 may be performed using the computer system 10 of FIG. 4. This computer system 10 is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the computer system 10 shown in FIG. 4 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system 10 may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
performing a first execution of an application on a virtual machine;
determining a set of virtual machine parameters associated with the first execution by mapping one or more command lines of the application to the set of virtual machine parameters, the set of virtual machine parameters comprising at least a set of buffer sizes and the set of buffer sizes comprises a set of maximum buffer sizes;
storing the set of virtual machine parameters in a cache;
performing a second execution of the application on the virtual machine, wherein the second execution retrieves the set of virtual machine parameters from the cache;
updating the mapping of one or more command lines of the application to one or more buffer sizes of the set of maximum buffer sizes when the virtual machine performs a phase change from a start-up to a steady state; and
updating the stored mapping of one or more command lines of the application to one or more buffer sizes of the set of maximum buffer sizes in the cache when at least one buffer size of the one or more buffer sizes changes.

2. The computer-implemented method of claim 1 wherein the set of maximum buffer sizes specifies a maximum size for any of: a virtual machine stackmap buffer, a maximum garbage collector (GC) heap size, a thread pool size, a string intern table size, or a maximum heap size.

3. The computer-implemented method of claim 1 further comprising updating the stored mapping of one or more command lines of the application to one or more buffer sizes of the set of maximum buffer sizes when the virtual machine shuts down.

4. The computer-implemented method of claim 1 further comprising providing the cache as a shared classes cache configured for storing buffer sizes and metadata from one or more previous application runs so as to allow subsequent runs of the application to locate the buffer sizes and the metadata.

5. The computer-implemented method of claim 1 further comprising performing the mapping by mapping a single command line of the application to all buffers of the set of maximum buffer sizes, or to a subset of all buffers of the set of maximum buffer sizes.

6. The computer-implemented method of claim 1 further comprising performing the mapping by mapping each of a plurality of respective command lines of the application to a corresponding buffer size of the set of maximum buffer sizes, or by mapping each of a plurality of respective command lines to all buffers of the set of maximum buffer sizes.

* * * * *